United States Patent [19]

Tackett, Jr.

[11] Patent Number: 5,082,056
[45] Date of Patent: Jan. 21, 1992

[54] IN SITU REVERSIBLE CROSSLINKED POLYMER GEL USED IN HYDROCARBON RECOVERY APPLICATIONS

[75] Inventor: James E. Tackett, Jr., Littleton, Colo.

[73] Assignee: Marathon Oil Company, Findlay, Ohio

[21] Appl. No.: 598,293

[22] Filed: Oct. 16, 1990

[51] Int. Cl.$^5$ .................... E21B 43/22; E21B 33/138
[52] U.S. Cl. .................... 166/295; 166/300; 252/342; 252/358
[58] Field of Search ............ 166/270, 294, 295, 278, 166/300, 308; 252/315.4, 342, 358, 8.551

[56] References Cited

U.S. PATENT DOCUMENTS

| | | | |
|---|---|---|---|
| 3,892,275 | 7/1975 | Lybarger et al. | 166/250 |
| 3,960,736 | 6/1976 | Free et al. | 252/8.551 |
| 4,137,182 | 1/1979 | Golinkin | 252/8.551 |
| 4,169,798 | 10/1979 | DeMartino | 252/8.551 |
| 4,193,533 | 3/1980 | Golinkin | 166/295 |
| 4,202,795 | 5/1980 | Burnham et al. | 252/332 |
| 4,754,809 | 7/1988 | van Zanten | 252/8.551 X |
| 4,946,604 | 8/1990 | Smith | 252/8.551 |
| 4,957,165 | 9/1990 | Cantu et al. | 166/300 X |
| 4,986,356 | 11/1991 | Lockhart et al. | 166/300 |

OTHER PUBLICATIONS

T. P. Lockhart, "A New Mild Chemical Method for the Degelation of Cr+3-Polyacrylamide Gels" May 26, 1989.

*Primary Examiner*—George A. Suchfield
*Attorney, Agent, or Firm*—Jack L. Hummel; Jack E. Ebel

[57] ABSTRACT

Reversible crosslinked polymer gels are prepared by adding a degelling agent precursor to a gelation solution during initial preparation. The precursor is integrated into the resulting gel and undergoes hydrolysis to transform into an active degelling agent which reverses the gel. The process has specific utility to hydrocarbon recovery applications where in situ gels are difficult to contact with conventional reversing agents.

16 Claims, No Drawings

IN SITU REVERSIBLE CROSSLINKED POLYMER GEL USED IN HYDROCARBON RECOVERY APPLICATIONS

BACKGROUND OF THE INVENTION

1. Technical Field:

The invention relates to hydrocarbon recovery from a subterranean hydrocarbon-bearing formation and more particularly to a reversible polymer gel used in hydrocarbon recovery applications.

2. Background Information:

Crosslinked polymer gels have widespread utility in hydrocarbon recovery applications. For example, gels have utility as fracturing fluids and workover fluids. Gels also have utility as a permeability reducing material for conformance improvement, zone abandonment, and other fluid diversion processes.

It is often desirable to reverse gels after a specified time period since gels used in many applications have only temporary utility. For example, gels used as fracturing fluids become obsolete once the fractures are formed and preferably are reversed thereafter. Oxidants, such as persulfates, hypochlorites, peroxides, and metal cations are well known reversing agents which reverse polymer gels. Oxidants reverse the gels by degradation, i.e., attacking the polymer at numerous points along its backbone to fragment the polymer molecule.

A second type of gel reversing agent is ligands or chelating agents which form complexes termed chelates with the gel crosslinking agent. These agents reverse the gel by a degelation mechanism rather than a degradation mechanism. Degelation differs from oxidant degradation in that the reversing agent attacks the crosslinks between the polymer molecules rather than the polymer molecule itself.

The chelating agent removes the crosslinking agent from the crosslinking site by complexing with it. Chelating agents initiate degelation immediately upon contact with a crosslinked polymer gel. Thus, the chelating agent must be maintained separate from the gel until degelation is desired. To effect in situ degelation of a subterranean gel, the chelating agent must be withheld from the subterranean formation prior to reversal. Unfortunately, adequate contacting of a mature gel in situ which has penetrated the formation matrix is extremely difficult to accomplish by post-gelation injection of the chelating agent. For this reason, chelating agents presently have limited utility as gel reversing agents.

A process is needed which effectively employs chelating agents for in situ degelation. Specifically a process is needed which effectively utilizes chelating agents for in situ degelation of crosslinked polymer gels penetrating a formation away from a well bore.

SUMMARY OF THE INVENTION

The present invention is a process relating to a reversible crosslinked polymer gel which incorporates a degelling agent precursor into the gelation solution before the gel is placed in a subterranean formation. The degelling agent precursor does not inhibit initial creation of the gel in the formation, but the precursor ultimately hydrolyzes over time transforming into an active degelling agent which reverses the gel.

The degelling agent is a chelating agent, also termed a ligand, which forms chelates with the crosslinking agent of the gel. Since the crosslinking agent is the component of the gel which imparts structure thereto, removal of the crosslinking agent from the polymer crosslinking sites effectively reverses the gel.

The present invention has specific utility for degelling crosslinked polymer gels placed in subterranean formations in conjunction with hydrocarbon recovery applications. The invention incorporates the degelling agent precursor in the gelation solution at the surface prior to gel placement and maturity. Thus, the invention overcomes the problems attendant with processes which attempt to contact the degelling agent with the gel by post-gelation injection of the degelling agent.

The invention is particularly advantageous because the rate determining step establishing the degelation time is the rate of precursor hydrolysis. Thus, the practitioner can create a gel having a predetermined lifetime as a function of the precursor hydrolysis conditions. By selecting the hydrolysis conditions accordingly, gels can be prepared which reverse from within a few hours up to several months. For this reason the present invention has utility in virtually any hydrocarbon recovery application requiring reversible crosslinked polymer gels.

DESCRIPTION OF PREFERRED EMBODIMENTS

The present invention is a process for producing, placing and reversing a crosslinked polymer gel. The gel derives from a gelation solution which is prepared according to the present invention by combining a crosslinkable polymer, a crosslinking agent, and a degelling agent precursor in a solvent. Upon contact, the crosslinking agent reacts with the crosslinking sites of the polymer to transform the gelation solution into a structured gel. Throughout creation of the gel, the degelling agent precursor remains substantially unreactive with the polymer and crosslinking agent.

The term "gel" as used herein is directed to a continuous three-dimensional crosslinked polymeric network integrating a liquid into the interstices of the network. The crosslinked polymeric network provides the gel structure. Depending upon their degree of structure, gels can have a broad spectrum of properties, ranging from flowing gels which are slightly more viscous than water to nonflowing gels which are very rigid. The term "flowing gels" as used herein refers to gels which flow under the force of gravity when unconfined at ambient atmospheric conditions. "Nonflowing gels" do not flow under these conditions.

Gels are characterized as either "mature" or "immature". A mature gel is one in which crosslinking, or gelation as it is alternatively termed, of the polymer by the crosslinking agent has proceeded to completion because either the crosslinking agent or the crosslinking sites are all consumed. An immature gel is a gel in which crosslinking has not gone to completion. In either case, the degree of crosslinking imparts structure to the gel which would not be found in an equivalent polymer solution free of the crosslinking agent.

A gel which has been reversed reverts to a solution which is substantially free of structure. The solution of the reversed gel has properties equivalent to a polymer solution free of the crosslinking agent. The solution is substantially less viscous than the preceding gel and in most cases resembles a water-like liquid.

The present process is applicable to the reversal of gels having utility in virtually any transient application. The process has specific utility to gels which are placed in remote locations, such as subterranean formations, where reversal of the gel is difficult because the gel cannot be readily contacted by a reversing agent.

A reversing agent as defined herein is any material which reverses a gel. Degelling agents are reversing agents. Although the present invention is not limited to any mechanism, it is believed that a degelling agent reverses a gel by attacking the crosslinking sites to complex the crosslinking agent while maintaining the polymer molecule substantially intact. This is in contrast to conventional oxidant reversing agents which reverse the gel by breaking up the polymer molecule.

Polymers having utility in the present invention are crosslinkable polymers and preferably polymers having carboxylate crosslinking sites. The more preferred polymers are acrylamide-containing polymers. Of the acrylamide-containing polymers, polyacrylamide (PA), partially hydrolyzed polyacrylamide (PHPA), copolymers of acrylamide and acrylate or derivatives thereof including acrylate esters, acrylate salts and acrylic acid, and carboxylate-containing terpolymers of acrylate or derivatives thereof, are the most preferred. Polymers are characterized herein by the mole percentage of monomer building blocks on the polymer chain which have carboxylate crosslinking sites. PA typically has about 3 or less mole percent while PHPA typically has about 30 to about 40 mole percent.

The crosslinking agent effects a bond termed a crosslink between the crosslinking sites of the same or different polymer molecules. Crosslinking of the polymer creates the network structure of the gel. The crosslinking agent is preferably a molecule or complex containing a reactive metal cation. The reactive metal cation is termed a crosslinker. A preferred crosslinker is a transition metal cation and more preferably a trivalent chromium cation as found in a crosslinking agent complex such as chromic triacetate or chromic trichloride. Other preferred crosslinkers are trivalent aluminum and tetravalent titanium and zirconium.

The solvent of the gelation solution may be any liquid in which the polymer, crosslinking agent and degelling agent precursor can be dissolved, mixed, suspended or otherwise dispersed to facilitate uniform distribution for proper gel formation and subsequent degelation. The solvent is substantially unreactive with the above-recited gel components. The solvent is preferably an aqueous liquid such as fresh water, distilled water or a produced reservoir brine.

Examples of gels made from gel components having utility in the present invention are disclosed in U.S. Pat. No. 4,683,949 which is incorporated herein by reference.

The gelation solution of the present invention further includes a degelling agent precursor which is substantially unreactive with the other components in the gelation solution, but which is capable of transformation over time to a degelling agent within the gel. Unlike its precursor, the degelling agent is reactive with the gel, effecting reversal thereof.

A preferred degelling agent precursor is a monoamide, diamide, monoester or diester having as its hydrolysis product a carboxylate-containing chelating agent or ligand. Exemplary diesters having utility in the present invention include malonates, oxalates, and derivatives thereof. Exemplary monoesters include the monoester analogs of the above-listed diesters. Exemplary diamides include malonamide, oxalamide and derivatives thereof. Exemplary monoamides include oxamic acid and malonamic acid. Less preferred exemplary esters and amides are succinates and their monoester analogs and additionally succinamide succinamic acid.

The preferred degelling agents of the present invention are the corresponding ligands resulting from hydrolysis of the above-recited exemplary precursors. Preferred degelling agents include malonic, oxalic, succinic, maleic acid and their corresponding salts.

The ligand, i.e., degelling agent, is believed to compete with the crosslinking sites for the transition metal cation crosslinker. If the ligand is a sufficiently strong degelling agent, it will chelate the cation forming a chelate complex which renders the cation unavailable for polymer crosslinking. Generally ligands having an equilibrium constant with the crosslinker which is greater than 15 satisfy this requirement. As a consequence, the crosslink bonds are lost and the reversed gel loses its structure, reverting to a solution of the polymer and chelate.

The components of the gelation solution can be combined in any manner known to one skilled in the art irrespective of the order of combination. However, it is often desirable to combine the components of the gelation solution at approximately the same time, i.e., substantially simultaneously, to ensure predictable timing of gel formation and subsequent gel reversal. It is generally preferable to place the gel at the site of its intended application prior to maturity thereof.

The degelation time, which is defined as the period from degelling agent precursor addition to gel reversal, is a strong function of the degelling agent precursor hydrolysis rate. The hydrolysis rate is in turn dependent on the temperature and pH of the gelation environment. At a high temperature, the hydrolysis rate is accelerated and consequently the degelation time is shortened. In hydrocarbon recovery applications the gelation temperature is the formation temperature which is a fixed variable. Therefore, when long degelation times are required, one selects a degelling agent precursor having a particularly slow hydrolysis rate and vice versa when short degelation times are required.

The hydrolysis reaction can be either acid or base catalyzed. Where long degelation times are required, the gelation environment is preferably in a range from 3 to 5 and most preferably in a range from 4 to 5. If a shorter degelation time is required, the gelation environment is rendered more basic, preferably in a range from about 5 to 6.

In addition to hydrolysis rate, the degelation time is a function of the molar ratio of the degelling agent precursor to crosslinker. By increasing the molar ratio of degelling agent precursor to crosslinker, one can correspondingly decrease the degelation time. Likewise, by decreasing the ratio one can increase the degelation time.

The degelation time is also a function of the mole percentage of monomeric groups on the polymer which contain crosslinking sites. Polymers having a high percentage of crosslinking sites require a higher concentration of degelling agent precursor to achieve the same degelation time as polymers having a lower concentration of crosslinking sites. For example, PHPA requires a higher concentration of degelling agent precursor than PA to effect degelation in the same time.

As is apparent to one skilled in the art, one can design gels using the present invention which have predictable gelation times and predictable degelation times. Gelation time is defined as the time from gelation solution formation to gel maturity. Degelation time can range anywhere from 3 hours or less to 120 days or more depending on the selection of the gelation solution variables. Thus, the practitioner selects the variables of the gel, i.e., specific components, concentration and temperature, to satisfy the requirements of the particular application.

The present invention is particularly applicable to hydrocarbon recovery applications. Fracturing fluids, The gelation solution is completed by adding 0.369 ml of a 10% chromium acetate solution. Each sample is maintained at the specified temperature in a sealed sample vial from which oxygen is excluded while gelation and degelation times are recorded and qualitative observations of the sample are noted. In some cases the quantitative elasticity expressed as the storage modulus $G'$ (dyne/cm$^2$) of the sample is recorded. The results of the examples are shown in the table below.

TABLE

| Example No. | Temp °C. | Mole % Crosslinking Sites | Precursor | Mole Ratio Precursor: Crosslinker | Initial Gelation Time (Hrs.) | Complete Gelation Time (Hrs.) | Gelled Product | Delegation Time (Hrs.) | Degelled Product |
|---|---|---|---|---|---|---|---|---|---|
| 1 | 60 | 2 | MM | 40:1 | 7 | 20 | nonflowing | 44 | watery |
| 2 | 60 | 2 | None | — | 7 | 20 | nonflowing | no degel | — |
| 3 | 60 | 2 | MA | 40:1 | 7 | 20 | nonflowing | no degel | — |
| 4 | 60 | 2 | MO | 40:1 | no gel | — | — | — | — |
| 5 | 60 | 3 | MM | 40:1 | 2.5 | 11 | $G' = 118$ | 43 | watery |
| 6 | 60 | 3 | MM | 10:1 | 2 | 14 | $G' = 150$ | 120 | $G' = 6$ |
| 7 | 60 | 30 | MM | 40:1 | 3 | 7 | nonflowing | 54 | slightly viscous |
| 8 | 60 | 30 | None | — | 2 | 3 | nonflowing | no degel | — |
| 9 | 60 | 30 | MA | 40:1 | 2 | 3 | nonflowing | no degel | — |
| 10 | 60 | 30 | MO | 40:1 | no gel | — | — | — | — |
| 11 | 80 | 3 | MM | 40:1 | 0.5 | 2 | $G' = 113$ | 11 | watery |
| 12 | 80 | 3 | MM | 10:1 | 0.2 | 2.3 | $G' = 127$ | 42 | watery |
| 13 | 124 | >0.1 | MA | 40:1 | 3 | 14 | $G' = 320$ | 240 | $G' = 40$ |
| 14 | 124 | >0.1 | None | — | 3 | 19 | $G' = 1200$ | 240 | $G' = 58$ |
| 15 | 124 | 2.5 | None | — | >0 | 5 | $G' = 2150$ | 120 | $G' = 2$ |
| 16 | 116 | >0.1 | MA | 10:1 | 6 | 48 | $G' = 1600$ | 168 | $G' = 490$ |
| 17 | 85 | >0.1 | None | — | 96 | 120 | nonflowing | none | — |
| 18 | 85 | >0.1 | MA | 10:1 | 144 | 264 | nonflowing | 2880 | barely flowing |
| 19 | 85 | >0.1 | MA | 40:1 | no gel | — | — | — | — |
| 20 | 104 | >0.1 | None | — | 10 | 24 | rigid | no degel | — |
| 21 | 104 | >0.1 | MA | 10:1 | 24 | 24 | nonflowing | 2880 | barely flowing |
| 22 | 104 | >0.1 | MA | 40:1 | 24 | 24 | barely flowing | 624 | watery |
| 23 | 121 | >0.1 | None | — | 6 | 6 | nonflowing | 2880 | slightly viscous |
| 24 | 121 | >0.1 | MA | 10:1 | 6 | 10 | nonflowing | 2880 | slightly viscous | workover fluids, conformance improvement, well bore shutins, and fluid diversions are but a few of the applications wherein transitory gels have utility. The gels are placed in downhole environments, such as formation matrix, fractures, or other remote anomalies, where subsequent in situ contacting of the gel with a reversing agent breaker is virtually impossible for effective reversal of the gel. As such, the present invention employing an integral degelling agent precursor in the gelation solution has particular utility for in situ gel reversal.

The following examples demonstrate the practice and utility of the present invention, but are not to be construed as limiting the scope of the invention to the gels disclosed therein.

EXAMPLES

Stock solutions of dimethyl oxalate (MO), dimethyl malonate (MM) and malonamide (MA) are prepared in water at a concentration which will produce a desired molar ratio between the precursor and the crosslinker in the resulting gelation solution. The pH of the stock solution is adjusted to between 4.5 and 5.

6 grams of a 5% PA or PHPA solution, the polymer having a molecular weight of 290,000, are combined with 9 grams of a stock solution selected from above. For the control, 6 grams of the polymer solution are added to 9 grams of distilled water. The pH of each solution is adjusted to a range between 4.1 and 4.6.

It is apparent that dimethyl oxalate hydrolyzes too rapidly to allow gel formation at 60° C. Thus, the oxalate has more utility at lower temperatures. In contrast, malonamide hydrolyzes very slowly. At 60° C. it has utility for very long degelation times. Dimethyl malonate is the preferred degelling agent precursor at 60° C. for relatively short degelation times. In a similar manner, the remaining data show how the independent gelation variables may be selected to achieve other desired gelation and degelation times.

While the foregoing preferred embodiments of the invention have been described and shown, it is understood that the alternatives and modifications, such as those suggested and others, may be made thereto and fall within the scope of the invention.

I claim:

1. A process for reversing a crosslinked polymer gel comprising:
   preparing a crosslinked polymer gel comprising a crosslinkable polymer, a crosslinking agent and a degelling agent precursor;
   hydrolyzing said precursor to a degelling agent; and
   complexing said degelling agent with said crosslinking agent to reverse said gel.

2. The process of claim 1 wherein said crosslinkable polymer has a plurality of carboxylate crosslinking sites.

3. The process of claim 1 wherein said crosslinking agent comprises a metal cation.

4. The process of claim 3 wherein said metal cation is selected from the group consisting of chromium, aluminum, titanium, and zirconium.

5. The process of claim 1 wherein said degelling agent is a carboxylate-containing ligand.

6. The process of claim 5 wherein said degelling agent precursor is an ester or amide precursor of said carboxylate-containing ligand.

7. The process of claim 1 wherein said degelling agent precursor is selected from the group consisting of malonates, oxalates, succinates, malonamide, oxalamide, succinamide and derivatives thereof.

8. The process of claim 1 wherein said degelling agent is selected from the group consisting of malonic acid, oxalic acid, succinic acid, and salts thereof.

9. The process of claim 1 wherein said degelling agent precursor is preselected to obtain a desired degelation time based on precursor hydrolysis rate.

10. A process for reversing a crosslinked polymer gel comprising:
preparing a crosslinked polymer gel comprising an acrylamide-containing polymer, a crosslinking agent and a degelling agent precursor;
hydrolyzing said precursor to a degelling agent; and
reacting said degelling agent with said gel to reverse said gel.

11. A process for reversing a crosslinked polymer gel comprising:
preparing a crosslinked polymer gel comprising an acrylamide-containing polymer, a metal cation-containing crosslinking agent and a degelling agent precursor selected from the group consisting of malonates, oxalates, malonamide, oxalamide and derivatives thereof;
hydrolyzing said precursor to a degelling agent selected from the group consisting of malonic acid, oxalic acid, and salts thereof; and
reacting said degelling agent with said gel to reverse said gel.

12. The process of claim 11 wherein said metal cation is trivalent chromium.

13. A reversible polymer gel composition comprising an acrylamide-containing polymer, a metal cation-containing crosslinking agent and a hydrolyzable degelling agent precursor selected from the group consisting of malonates, oxalates, succinates, malonamide, oxalamide, succinamide and derivatives thereof.

14. The composition of claim 13 wherein said metal cation is chromium.

15. A process for placing a crosslinked polymer gel in a subterranean formation and subsequently reversing the gel in situ, the process comprising the steps of:
preparing a crosslinked polymer gel by combining a crosslinkable polymer, a crosslinking agent and a degelling agent precursor in solution;
injecting said crosslinked polymer gel into a subterranean formation and placing said gel in a desired treatment region of said formation;
hydrolyzing said precursor to a degelling agent in situ; and
complexing said degelling agent with said crosslinking agent to reverse said gel in situ.

16. A process for placing a crosslinked polymer gel in a subterranean formation and subsequently reversing the gel in situ, the process comprising the steps of:
preparing a crosslinked polymer gel by combining a crosslinkable, acrylamide-containing polymer, a crosslinking agent and a degelling agent precursor in solution;
injecting said crosslinked polymer gel into a subterranean formation and placing said gel in a desired treatment region of said formation;
hydrolyzing said precursor to a degelling agent in situ; and
reacting said degelling agent with said gel to reverse said gel in situ.

* * * * *